Nov. 22, 1927.  1,650,264
J. D. COUGHLIN
ATTACHMENT FOR STOPPERS AND THE LIKE
Filed May 1, 1923

INVENTOR
Joseph D. Coughlin
BY
his ATTORNEY

Patented Nov. 22, 1927.

1,650,264

UNITED STATES PATENT OFFICE.

JOSEPH D. COUGHLIN, OF NEW YORK, N. Y., ASSIGNOR OF ONE-THIRD TO RAE ECKERT AND ONE-THIRD TO PAUL KEREMES.

ATTACHMENT FOR STOPPERS AND THE LIKE.

Application filed May 1, 1923. Serial No. 635,864.

My present invention is shown as embodied in a supplemental cover or handle adapted for ready attachment to or removal from the pasteboard closure now commonly used on milk bottles, but it will be evident that certain features of the device and even the device as a whole is applicable for detachable use on any pasteboard article, for any desired purpose.

As devised for use on milk bottle covers, it comprises a member which preferably combines adaptability for use both as a handle and also as a guide for the means whereby it is attached to the pasteboard or similar perforable cover of the milk bottle. The attaching means consists of reciprocable members adapted to penetrate the cover, preferably from diametrically opposite directions so that in piercing the cover they apply a balanced thrust. The balanced thrust is not so important with respect to the pasteboard cover when the latter is held from displacement by the bottle, but it has importance in that it lessens the tendency toward lateral displacement of the device itself, thus making it easier to centre the latter with respect to the cover. Furthermore, the points of engagement of the several piercing members with the cover are symmetrically distributed near but not at the edge of the cover so that the prying strain applied in removing the latter is properly distributed and the device is, therefore, practically immune from danger of tearing out of the securing tines.

For best functioning with reference both to centering and tearing out, each of the piercing members preferably comprises a pair of piercing prongs whereby the pasteboard cover is engaged and held at four widely separated points, so related that when force is applied to pry the cover loose in any direction, the strain is taken by more than one of the prongs. For use on milk bottles I prefer to make the body or guide portion of substantially less diameter than the pasteboard closure so that there is a free annulus of the latter which can yield upwardly when the cover is plugged back into place to close the bottle. The maximum diameter of the device, near the top, is preferably great enough to prevent inserting the device within the bottle when the pasteboard has been detached. Hence the device can be used as a cover, without the pasteboard.

An important feature of the invention is upwardly concaving the bottom of the body portion or guide element so that when the piercing points are retracted they are housed within the concavity but are properly overlapped so that the four penetrating points on the cover are properly distributed with reference to the periphery of the latter. Features not necessarily essential to the above are making the body or guide element in a form of a sheet metal stamping and the two pairs of prongs each in the form of an integral piece of bent wire, the guiding function being afforded by opposite pairs of holes in the rim of the body and corresponding pairs of holes in the bottom of said body.

The foregoing will be more fully understood from the following description of the accompanying drawings, in which—

Figure 1:
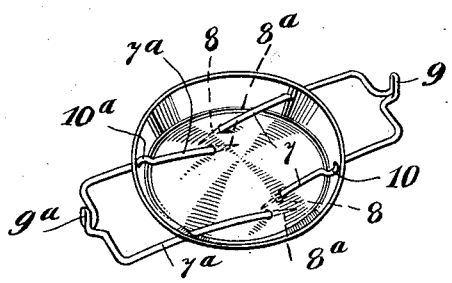
Fig. 1 is a perspective view of the device with the tines retracted.
Figure 2:
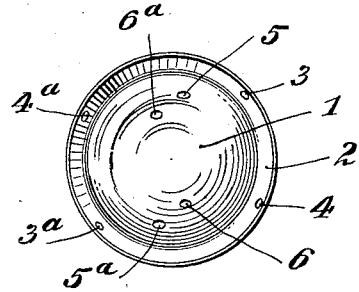
Fig. 2 is a top plan view of the body portion with the tines removed.
Figure 3:
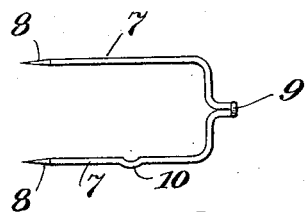
Fig. 3 is a plan view with one of the bent wires embodying a pair of tines.

The body portion comprises a simple stamping having an upwardly concave bottom 1 and a rim 2. The rim is provided with a pair of holes 3, 4, and the bottom with a corresponding pair of holes 5, 6, for the U-shaped wire or bail comprising tines or prongs 7, 7, with penetrating points 8, 8, retracting and thrust element 9 and detent crimp 10.

Symmetrically arranged with respect to the above, are the opposite holes $3^a$, $4^a$, in the flange, and $5^a$, $6^a$, in the upwardly concave bottom serving as guides for the opposite U-shaped wire comprising parallel tines $7^a$, $7^a$, with piercing points $8^a$, $8^a$, forcing and retracting element $9^a$, and detent crimp $10^a$.

By reason of the upward concavity of the bottom 1, (Fig. 4), the holes 5, 6, are on the same side of the center as the co-operating guide holes 3, 4, and correspondingly the guide holes $5^a$, $6^a$, are on the same side of the center as the holes $3^a$, $4^a$; nevertheless the levels of the sets of holes are such that the respective pairs of tines 7, 7, and $7^a$, $7^a$, cross each other below the bottom 1 and engage the pasteboard cover divergently.

Hence when the cover is pried off there will always be one or more tines that would have to tear through the pasteboard laterally for quite a distance before the device can come loose. The wire is thick enough so that in practice it never cuts the pasteboard.

Preferably the sharpening of the points 8, 8ª, and the curvature of the tines is such that the initial penetration of the pasteboard is at an angle more obtuse than is the direction of the tines where they engage the guide holes and while the penetration is substantially endwise, there is preferably also slight upward wedging tendency to compensate or even over-compensate for slip that may occur, the effect being to keep the annular bearing surface 11 of the device in firm contact with the pasteboard cover.

Figure 4:
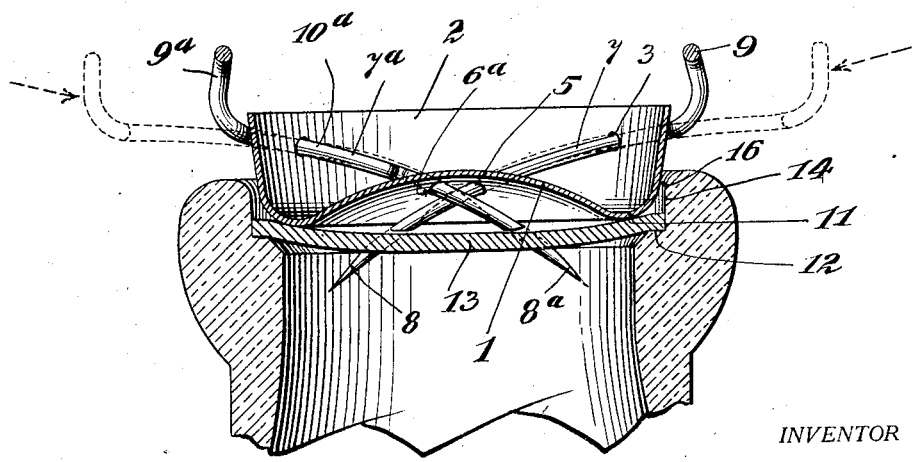
Fig. 4 is a vertical axial section showing the device as fully applied to the pasteboard cover of a milk bottle.

As shown in Fig. 4, the milk bottle mouth comprises a ledge 12 on which cover 13 rests and the slightly overhung lip 14. The latter is of slightly smaller diameter than the cover 13, so that when in final position the cover is slightly concaved downward to have an expanding fit within the mouth of the bottle.

In practice the body portion 1, 2, is an ordinary stamping and the U-shaped wire members bent in the form shown can be assembled therewith by merely forcing the parallel tines of one through the respective holes 3, 4, 5, 6, from the one side and the other pair through 3ª, 4ª, 5ª, 6ª, from the other side, until their respective detent portions 10, 10ª, are forced inside of the rim 2, as indicated in Figs. 1 and 4.

The article, thus assembled and with the parts in the position shown in Fig. 1, is applied to the mouth of the milk bottle. The centering does not have to be accurate, consequently a more or less annular or crescent space 16 will separate the flange 2 from the lip 14 of the bottle. The device is then attached by squeezing toward each other the thrust elements 9 and 9ª, the pressure thus applied being naturally also a downward pressure keeping the annulus surface 11 in contact with the pasteboard 13.

The parts then being in the position shown in Fig. 4, the space 16 is important since it permits angular leverage of the device in any direction to bend and reverse the downward arch of cover 13 and thus free it from its locking engagement within the neck of the bottle. When this has been done the cover may be removed and replaced as a practically permanent unit with my device, so long as the milk bottle is in use. An important point is that in such use, the rim portion 2 is not utilized and does not constitute the bottle closure. The pasteboard cover remains at all times the only element having a bottle closing function and this function is practically unmodified by presence of my attachment, except as the latter is an effective lever for opening the bottle and is an effective plunger replacing the pasteboard cover in the downwardly arched re-sealing position. Nevertheless, the upper edge of the rim 2 is preferably of larger diameter than the mouth of the bottle so the device may be used alone, as a plug closure, if desired, as when the pasteboard cover has been soiled or broken.

A minor advantage is that when the stopper is to be detached or thrown away, the tip 9 may be grasped by the thumb and finger of one hand, and 9ª by the other, and the cover cleanly detached and permitted to fall in any desired location or receptacle by simply separating the hand.

The sliding tines have all the advantage of straight rectangular motion so far as concerns manipulation and they are effectively guided, each in its own plane perpendicular to the surface of the pasteboard stopper and the annular surface 11 which bears thereon. Such slight curvature as they have in a vertical plane is of double advantage because the angle at which the shanks pass through the relatively flat bottom 1 as well as the angle at which the penerating points attack the pasteboard cover is quite materially greater than if the tines were exactly straight. Moreover, when the tines are retracted the members, 9, 9ª, do not project upwardly anywhere near as much as they would if the tines were straight, nor does the rim 2 have to be made of anything like as great height as would be required for perfectly straight line reciprocation of a perfectly straight tine.

Consideration of the mechanical relations of parts in the above device will make it clear that, notwithstanding its almost crude simplicity, it is remarkably adapted for niceties of operation. For instance, the guiding of the tines at two spaced bearing points represented by the co-operating rim and bottom guiding holes permits the above-described curving of the tine in the vertical plane and this curvature can be anything desired from an arc of a true circle which should give straight endwise thrust of the piercing point with good angle of contact upon the surface of the bottle stopper, up to a perfectly straight tine which would also give straight end thrust of the penetrating point; also the compromise indicated in the drawings wherein the shank portion which exercises guiding function is somewhat straighter than portions nearer the tip. Although the geometry of such two-point bearing of the tine may be somewhat complicated, the practice is extremely simple since merely bending the tips a little more downward will increase the above-described upward wedging action to take up lost motion between the bottle stopper and bearing surface 11 or a slight bend of the tip in the opposite direction will decrease, eliminate or reverse said effect as may be desired. Another mechanical feature is having two tines connected in single U so that each operates a key the other against rotation about a longitudinal axis, a function which is essential when the tines are curved to attack the bottle stopper at an angle greater than the line passing through the guide holes.

While I have thus described in considerable detail the advantages of downwardly curved tines, it will be obvious that by varying the proportions of the shell or body 1, 2, and the position of the guide holes, perfectly straight tines could be made to engage the cover at an angle sufficiently high for practical purposes and, if the points were cut on a bevel as shown, straight tines could be made to have a substantial amount of the above-described upward wedging function.

While the above-described arrangement of two pairs of tines is highly desirable, it will be evident that the balanced thrust at distributed points on the cover could be applied with other arrangements. For instance, a pair of tines on one side to be employed in connection with a single tine on the opposite sides; or single tines could be employed at angles of 120° from each other, etc., etc.

I claim:

1. A stopper remover for milk bottles comprising a sheet metal stamping formed with a bottom surrounded by a flange so that the bottom affords an annular bearing surface for engagement with the stopper, said stamping being formed with pairs of co-operating guide holes, one hole of each pair extending through the flange, and another through the bottom, in combination with wire members bent to form parallel tines, each tine having two-point guided support afforded by one flange hole and one bottom hole.

2. A stopper remover for milk bottles comprising a sheet metal stamping formed with a bottom surrounded by a flange so that the bottom affords an annular bearing surface for engagement with the stopper, said stamping being formed with pairs of co-operating guide holes, one hole of each pair extending through the flange, and another through the bottom, in combination with wire members bent to form parallel tines, each tine having two-point guided support afforded by one flange hole and one bottom hole, said tines of one pair crossing the plane of the tines of the other pair and penetrating the stopper at four symmetrically distributed points substantially within the annulus of the bearing surface.

3. The combination specified by claim 2, with the further feature that the tines are curved in a plane vertical to the plane of the annulus for the purpose described.

Signed at New York city in the county of New York and State of New York this 26th day of April, A. D. 1923.

JOSEPH D. COUGHLIN.